United States Patent [19]
Stiffler

[11] Patent Number: 5,745,672
[45] Date of Patent: Apr. 28, 1998

[54] MAIN MEMORY SYSTEM AND CHECKPOINTING PROTOCOL FOR A FAULT-TOLERANT COMPUTER SYSTEM USING A READ BUFFER

[75] Inventor: Jack J. Stiffler, Hopkinton, Mass.

[73] Assignee: Texas Micro, Inc., Houston, Tex.

[21] Appl. No.: 564,024

[22] Filed: Nov. 29, 1995

[51] Int. Cl.$^6$ .................................................... G06F 11/00
[52] U.S. Cl. ....................................... 395/182.04; 771/162
[58] Field of Search ................................. 395/180, 181, 395/182.01, 182.02, 182.03, 182.05, 182.08, 182.09, 182.11, 182.14, 182.18, 488, 489; 364/228.3; 711/154, 161, 162

[56] References Cited

U.S. PATENT DOCUMENTS

| | | | |
|---|---|---|---|
| 3,588,829 | 6/1971 | Boland | 340/172.5 |
| 3,736,566 | 5/1973 | Anderson et al. | 340/172.5 |
| 3,761,881 | 9/1973 | Anderson et al. | 340/172.5 |
| 3,803,560 | 4/1974 | DeVoy et al. | 340/172.5 |
| 3,889,237 | 6/1975 | Alferness et al. | 340/172.5 |
| 3,979,726 | 9/1976 | Lange et al. | 340/172.5 |
| 4,020,466 | 4/1977 | Cordi et al. | 340/172.5 |
| 4,044,337 | 8/1977 | Hicks et al. | 364/200 |
| 4,164,017 | 8/1979 | Randell et al. | 364/200 |
| 4,228,496 | 10/1980 | Katzman et al. | 364/200 |
| 4,373,179 | 2/1983 | Katsumata et al. | 364/200 |
| 4,393,500 | 7/1983 | Imazeki et al. | 371/13 |
| 4,403,284 | 9/1983 | Sacarisen et al. | 364/200 |
| 4,413,327 | 11/1983 | Sabo et al. | 364/900 |
| 4,426,682 | 1/1984 | Riffe et al. | 364/200 |
| 4,459,658 | 7/1984 | Gabbe et al. | 364/200 |
| 4,484,273 | 11/1984 | Stiffler et al. | 364/200 |

(List continued on next page.)

FOREIGN PATENT DOCUMENTS

| | | | |
|---|---|---|---|
| 55-41528 | 3/1980 | Japan | G06F 11/16 |
| 55-115121 | 9/1980 | Japan | G06F 3/00 |
| 58-31651 | 2/1983 | Japan | H04M 3/22 |

OTHER PUBLICATIONS

M. Banatre, A. Gefflaut, C. Morin, "Scalable Shared Memory Multi-Processors: Some Ideas To Make Them Reliable", in *Hardware and Software Architectures for Fault Tolerance*, Springer-Verlag, 1994 Lecture Notes in Computer Science, presented after Jun. 10, 1993.

N.Bowen and D.Pradhan, "Processor-and Memory-Based Checkpoint and Rollback Recovery," 1993 IEEE Transactions on Computers, pp. 22-30.

Y.Lee and K.Shin, "Rollback Propagation Detection and Performance Evaluation of FTMR$^2$M —Fault Tolerant Multiprocessor," 1982 IEEE Transactions on Computers, pp. 171-180.

C.Kubiak et al., "Penelope: A Recovery Mechanism for Transient Hardware Failures and Software Errors, " 1982 IEEE Transactions on Computers, pp. 127-133.

A.Feridun and K.Shin, "A Fault-Tolerant Multiprocessor System with Rollback Recovery Capabilities," 1981 IEEE Transations on Computers, pp. 283-298.

P.Lee et al., "A Recovery Cache for the PDP-11," IEEE Transactions on Computers, vol. C-29, No. 6, Jun. 1980, pp. 546-549.

*Primary Examiner*—Albert Decady
*Attorney, Agent, or Firm*—Wolf, Greenfield & Sacks, P.C.

[57] ABSTRACT

A mechanism for maintaining a consistent, periodically updated state in main memory without constraining normal computer operation is provided, thereby enabling a computer system to recover from faults without loss of data or processing continuity. In a typical computer system, a processor and input/output elements are connected to a main memory subsystem that includes a primary memory. In embodiments of the present invention, a read buffer is also appended to this main memory subsystem. During normal processing, a pre-image of data written to the primary memory may be captured by the read buffer. Data captured in the read buffer can restore the system to a previous checkpoint. This structure and protocol can guarantee a consistent state in main memory, thus enabling fault-tolerant operation.

7 Claims, 6 Drawing Sheets

U.S. PATENT DOCUMENTS

| | | | |
|---|---|---|---|
| 4,566,106 | 1/1986 | Check, Jr. | 371/67 |
| 4,654,819 | 3/1987 | Stiffler et al. | 364/900 |
| 4,734,855 | 3/1988 | Banatre et al. | 364/200 |
| 4,740,969 | 4/1988 | Fremont | 371/12 |
| 4,751,639 | 6/1988 | Corcoran et al. | 364/200 |
| 4,817,091 | 3/1989 | Katzman et al. | 395/182.06 |
| 4,819,154 | 4/1989 | Stiffler et al. | 364/200 |
| 4,819,232 | 4/1989 | Krings | 371/9 |
| 4,905,196 | 2/1990 | Kirrmann | 365/200 |
| 4,924,466 | 5/1990 | Gegor et al. | 371/12 |
| 4,941,087 | 7/1990 | Kap | 364/200 |
| 4,958,273 | 9/1990 | Anderson et al. | 364/200 |
| 4,964,126 | 10/1990 | Musicus et al. | 371/36 |
| 4,965,719 | 10/1990 | Shoens et al. | 364/200 |
| 5,157,663 | 10/1992 | Major et al. | 371/9.1 |
| 5,214,652 | 5/1993 | Sutton | 371/9.1 |
| 5,239,637 | 8/1993 | Davis . | |
| 5,247,618 | 9/1993 | Davis . | |
| 5,269,017 | 12/1993 | Hayden et al. | 395/575 |
| 5,271,013 | 12/1993 | Gleeson | 395/182.08 |
| 5,276,848 | 1/1994 | Gallagher et al. | 395/425 |
| 5,313,647 | 5/1994 | Kaufman et al. | 395/700 |
| 5,325,517 | 6/1994 | Baker et al. | 395/575 |
| 5,325,519 | 6/1994 | Long et al. | 395/575 |
| 5,327,532 | 7/1994 | Ainsworth et al. | 395/200 |
| 5,408,649 | 4/1995 | Beshears et al. | 395/182.08 |
| 5,488,716 | 1/1996 | Schneider et al. | 395/182.11 |
| 5,488,719 | 1/1996 | Schultz . | |
| 5,504,861 | 4/1996 | Crockett et al. | 395/182.11 |

# MAIN MEMORY SYSTEM AND CHECKPOINTING PROTOCOL FOR A FAULT-TOLERANT COMPUTER SYSTEM USING A READ BUFFER

FIELD OF THE INVENTION

The present invention is related to computer memory systems and checkpointing protocols, particularly for fault tolerant computer systems.

BACKGROUND OF THE INVENTION

Fault tolerance in computers is generally realized in either of two ways: either through a hardware-intensive technique called masking, or a software-based approach called checkpointing. Masking is achieved by replicating hardware and executing computer programs on several independent units in parallel. The outputs of these units are then compared to determine their validity. In the simplest and oldest embodiment of this technique, three complete computers are implemented and a simple majority vote on their outputs is used to determine the "correct" output. If at least two of the computers are functioning properly and the voter system itself is also working correctly, the potentially incorrect output of the malfunctioning computer is outvoted and the correct answer is indeed presented to the user. While there are other embodiments of masking that are somewhat more efficient, masking systems generally suffer from the significantly increased cost of the hardware that must be added to mask out the effect of a faulty component. In addition, masking protects only against hardware faults; a software bug that causes one unit to malfunction will also cause other units running the same software to malfunction in the same way. All outputs will contain the same error which as a result will, as a result, pass undetected.

The alternative technique called checkpointing has the potential of providing tolerance to faults in a considerably more cost-effective way. This technique requires that the state of the entire computer be periodically recorded at time intervals designated as checkpoints. A fault may be detected by either a hardware fault monitor (e.g., by a decoder operating on data encoded using an error detecting code, by a temperature or voltage sensor, or by one device monitoring another identical device) or by a software fault monitor (e.g., an assertion executed as part of the executing code that checks for out-of-range conditions on stack pointers or addresses into a data structure). If a fault is detected, recovery involves first diagnosing and circumventing a malfunctioning unit, if possible, and then returning the system to the last checkpoint and resuming normal operation from that point.

Recovery is possible if sufficient hardware remains operational after any elements identified as faulty during the recovery process have been circumvented. In a multiprocessor system, for example, the system can continue to operate as long as at least one of the processors continues to function. Similarly, a system that can remap memory or redirect I/O through alternate ports can survive the loss of memory or I/O resources as well. Moreover, most faults encountered in a computer system are transient or intermittent in nature, exhibiting themselves as momentary glitches. It is therefore generally possible to recover from such faults without circumventing any hardware. However, since transient and intermittent faults can, like permanent faults, corrupt the data that is being manipulated at the time of the fault, it is necessary to have a consistent state to which the computer can return following such events. This is the purpose of the periodic checkpointed state.

Since checkpoints are typically established every 50 milliseconds or so, rolling an executing program back to its last checkpoint is generally entirely transparent to a user. If handled properly, all applications can be resumed from their last checkpoints with no loss of continuity and no contamination of data.

There are two primary advantages to checkpointing relative to masking. First, checkpointing is considerably less expensive to implement. Second, checkpointing offers protection against software as well as hardware faults. The first advantage simply reflects the fact that checkpointing does not require massive replication of hardware. The second advantage is a consequence of the fact that most software bugs remaining in well tested, mature software are exposed only in exceptional situations. Were this not true, the bugs would have been found and removed during normal testing. Such exceptional situations are generally caused by some asynchronous event such as an interrupt that forces program execution to follow a sequence that would not otherwise have been followed. If the system is forced to roll back to a consistent state and continue forward, that is, if the software bug is treated like a hardware transient, it is highly unlikely that the system will encounter exactly the same exception in exactly the same state as before. Consequently, it is highly unlikely that it will encounter the same bug a second time.

Checkpointing also suffers from two potential disadvantages relative to masking. First, masking generally results in instantaneous or near-instantaneous recovery from faults. Any resulting errors are simply masked, so no explicit recovery is necessary. Checkpointing requires that certain software routines be executed to diagnose the problem and to circumvent any permanently malfunctioning component of the computer. As a consequence, the resulting recovery time, typically on the order of one second, may preclude the use of this technique for achieving fault tolerance for some real-time applications where response times on the order of milliseconds or less are required. In applications in which humans directly interact with the computer, e.g., in transaction processing applications; however, a momentary interruption of a second or so is entirely acceptable and, in fact, is generally not even perceptible. Thus, this potential disadvantage of checkpointing is not relevant to that class of applications.

Second, checkpointing has traditionally been achieved at the application level. Thus, the application programmer has been required to be concerned about what data has to be checkpointed, and when it should be done. This requirement places a serious burden on the programmer and has seriously impeded the widespread use of checkpointing as a means for achieving fault tolerance.

More recently, techniques have been developed that allow checkpointing to be done at the system software level so that the application programmer need not be concerned with attempting to identify the data that has to be checkpointed or even be aware that checkpointing is taking place. For this to be possible, the system itself must be able to establish periodic checkpoints, regardless of the applications that it might be running. U.S. Pat. Nos. 4,654,819 and 4,819,154 to Stiffler describe a computer system capable of doing exactly that. The system accomplishes this kind of checkpointing by requiring each of its processors to retain all modified data in its local cache until it is time to establish a new checkpoint at which time all modified data is flushed out to main memory. Such caches are sometimes called blocking caches. Prior to flushing its blocking cache, a processor does a context switch during which it places the contents of its internal registers, including its program counter, on a stack which is flushed out with all the other modified data. Consequently, memory is updated all at once with data that is internally consistent, thereby establishing a checkpoint to which the system can safely return should it subsequently suffer a fault. To guarantee the ability to survive both main memory faults and faults experienced during the flushing operation itself, memory is duplicated, with each data item stored in both a primary location and a shadow location.

While this technique does accomplish its goal of establishing checkpoints without burdening the application programmer, it does have certain disadvantages due to its dependence on the use of a blocking cache. Since a processor cannot write any cache line back to main memory unless it writes back all currently modified lines at the same time, any cache overflow or any request by one processor for data held in another processor's cache requires the processor releasing the data to flush its entire cache. This requirement precludes the use of standard cache coherency protocols (for example, the protocol described in U.S. Pat. No. 5,276,848 to Gallagher) and creates potential porting and performance problems when programs are executed that rely on such standard protocols.

Other methods for capturing data for checkpointing purposes have been proposed, for example, by Kirrmann (U.S. Pat. No. 4,905,196) and by Lee et al. ("A Recovery Cache for the PDP-11", IEEE Trans. on Computers, June, 1980). Kirrmann's method involves a cascade of memory storage elements consisting of a main memory, followed by two archival memories, each of the same size as the main memory. Writes to the main memory are also written by the processor into a write buffer. When it is time to establish a checkpoint, the buffered data is then copied by the processor first to one of the archival memories and then to the second, although techniques are also described that eliminate the need for one of the copies. The two archival memories ensure that at least one of them contains a valid checkpoint, even if a fault occurs while a buffer-to-memory copy is in progress. Some problems with this architecture include a triplication of memory, the use of slow memory for the archival memory and the effect on processor performance since the three memory elements are different ports on the same bus.

The paper by Lee et al. discusses a method for saving data in a recovery cache before updated data is written to memory, for all memory locations falling within an application-specified range of addresses. This method involves converting all writes to memory within the range specified by the application into read-before-write operations. If a fault occurs during the execution of the application, the contents of the recovery cache are stored back into main memory, thereby restoring it to the state that it was when the application began its current execution. One problem with this method is that it slows the host system due to interference with memory cycles by the read-then-write operations, which requires changing bus protocol. It also requires checkpointing to be handled or considered by the application programmer.

Other techniques have been developed to establish mirroring of data on disks rather than in main memory. Since disk access is orders of magnitude slower than main memory access, such schemes have been limited to mirroring data files, that is, to providing a backup to disk files should the primary access path to those files be disabled by a fault. No attempt is made to retain program continuity or to recover the running applications transparently to the users of the system. In some cases, it is not even possible to guarantee that mirrored files are consistent with each other, only that they are consistent with other copies of the same file. U.S. Pat. No. 5,247,618 discloses one example of such a scheme.

SUMMARY OF THE INVENTION

Embodiments of the present invention provide a main memory device and a process for maintaining, in a computer system, a consistent, periodically-updated, checkpoint state in the computer system's main memory while allowing the use of conventional cache coherency protocols and non-blocking caches. The main memory device is accessed through one or more logical ports. The main memory contains a primary memory element and a checkpoint memory element which are both coupled to the port. The primary memory element is accessed in the same way as a standard main memory. The checkpoint memory element captures certain data accesses from the main memory which are detectable because the checkpoint memory element is connected to the same port as the primary memory element. The checkpoint memory element may be a physically separate memory module from the primary memory element, or the checkpoint memory element and the primary memory element may reside within the same memory module at different addresses. These captured accesses are then used to ensure the existence of a consistent checkpoint state in the main memory. A computer system using such a main memory device and having the appropriate detection and circumvention procedures can recover from faults without loss of data integrity or processing continuity.

In a typical computer system, a processor and input/output elements are connected to a main memory. The connection is typically provided by one or more memory buses, cross-point switches or other mechanisms. The main memory has one or more logical ports through which all accesses to the main memory are made.

In one embodiment of the present invention, a computer system includes a main memory and a buffer memory. The buffer memory is generally a last-in, first-out memory, or stack, that captures a pre-image of all data that is subsequently to be written back to the main memory of the computer system. Checkpoints are periodically established in the main memory. Data stored in the buffer memory is discarded after each checkpoint. In the event of a failure., the main memory can be returned to the state of the previous checkpoint by copying the data stored in the buffer memory into the main memory of the computer system. The computer system of this embodiment may include a shadow memory to provide fault tolerance against failures of the main memory. The shadow memory of this embodiment directly captures all data written to the main memory, without the data first being stored in a buffer memory. In the event of a failure of the main memory, the buffer memory can be used to restore the shadow memory to the state of the main memory at the last checkpoint, and the shadow memory can take the place of the main memory.

In a system in accordance with this invention, input and output (I/O) operations are normally handled in the following manner. During normal operations, I/O requests are made in any standard way, and are entered on an appropriate I/O queue by the operating system. However, the actual physical I/O operation is not initiated until the next checkpoint. Thus, in the event of a fault and a subsequent rollback to a checkpointed state, all pending I/O operations are also checkpointed. Disk and other idempotent I/O operations, i.e., operations that can be repeated without changing the result, can simply be restarted.

The appropriate disposition of communications I/O activities depends upon the communication protocol. For those protocols that accommodate the possible duplication of messages, the pending I/O can be restarted. For those that handle dropped messages, the I/O can be deleted from the pending queue. For those protocols that do not handle either dropped messages or repeated messages, the pending I/O is deleted from the pending queue. If the message was not actually sent before the fault, or was aborted as a result of the fault, the effect is the same as a transient communication link failure with the same consequences to the application or to the user. Since communication link interruptions are generally considerably more common than computer faults, the use of a protocol that cannot make such events transparent presumably means that the user or the application is prepared to cope with them in any event.

The mechanisms described herein can guarantee the existence of a consistent checkpoint state from which the computer can resume operation following a fault, thus enabling fault-tolerant operation.

BRIEF DESCRIPTION OF THE DRAWINGS

For a better understanding of the present invention, reference is made to the drawings which are incorporated herein by reference and in which.

DETAILED DESCRIPTION

The present invention will be more completely understood through the following detailed description which should be read in conjunction with the attached drawings in which similar reference numbers indicate similar structures. Reference is made to Applicant's co-pending U.S. patent application Ser. No. 08/258,165, filed Jun. 10, 1994, which is incorporated herein by reference.

Figure 1:
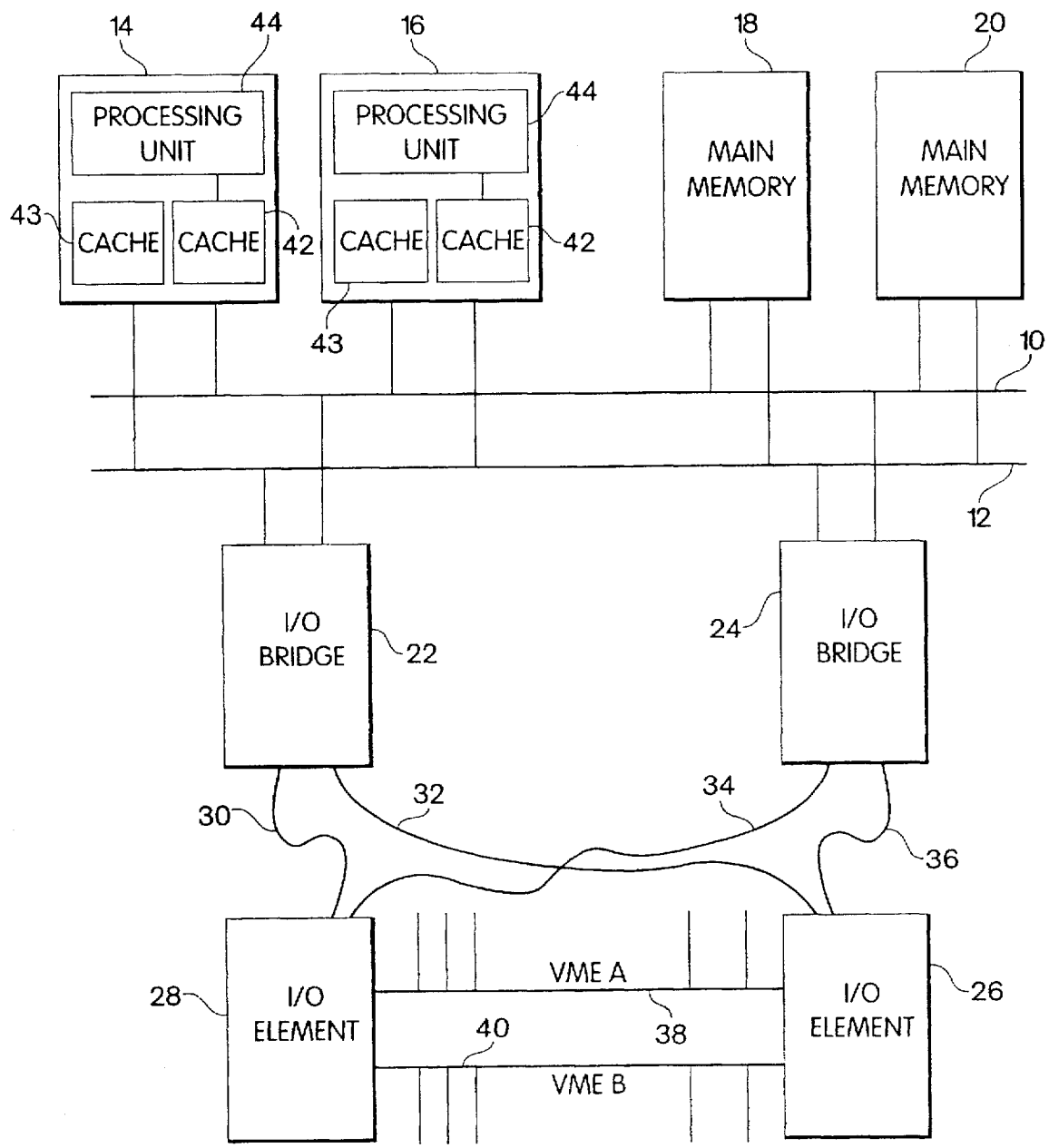
FIG. 1 is a block diagram of a computer system which uses a main memory structure of one embodiment of the present invention.

FIG. 1 is a block diagram of a computer system 11 with which the invention generally may be used. One or more processing elements 14 and 16 are connected to one or more main memory systems 18 and 20 via interconnection mechanisms 10 and 12 such as a bus or crosspoint switch. One or more input/output (I/O) subsystems 22 and 24 are also connected to the interconnection mechanism 10 (12). Each I/O subsystem comprises an input/output (I/O) element or bridge 26 (28) and one or more buses 30 and 32 (34 and 36). An I/O element 26 (28) may also be connected to any standard I/O bus 38 (40), such as a VME bus. For ease of description, only one of each of these systems and subsystems is referred to below.

Each processing element, e.g., 14, includes a processing unit 44 connected to a cache 42. This connection also connects the processing unit 44 and the cache 42 to the interconnection mechanism 10. The processing unit 44 may be any standard microprocessor unit (MPU). For example, the PENTIUM microprocessor, available from Intel Corporation, is suitable for this purpose. The processing unit 44 operates in accordance with any suitable operating system, as is conventional. A processing element 14 may include dual processing units 44 for self-checking purposes.

The cache 42 is either a write-through or a write-back type of cache and has an arbitrary size and associativity and may consist of more than one cache level in a hierarchical structure. The processing unit 44 may store in the cache 42 either data only or both computer program instructions and data. In the former case, an additional similar instruction cache 43 may be connected to the processing unit 44 for the processing unit 44 to store computer program instructions. This connection also connects the instruction cache 43 to the interconnection mechanism 10. If this system is a multiprocessing computer system, each processing unit 44 may use any conventional mechanism to maintain cache coherency, such as bus snooping. The cache 42 is connected to a main memory system, e.g., 18, via interconnection mechanism 10.

Figure 2:
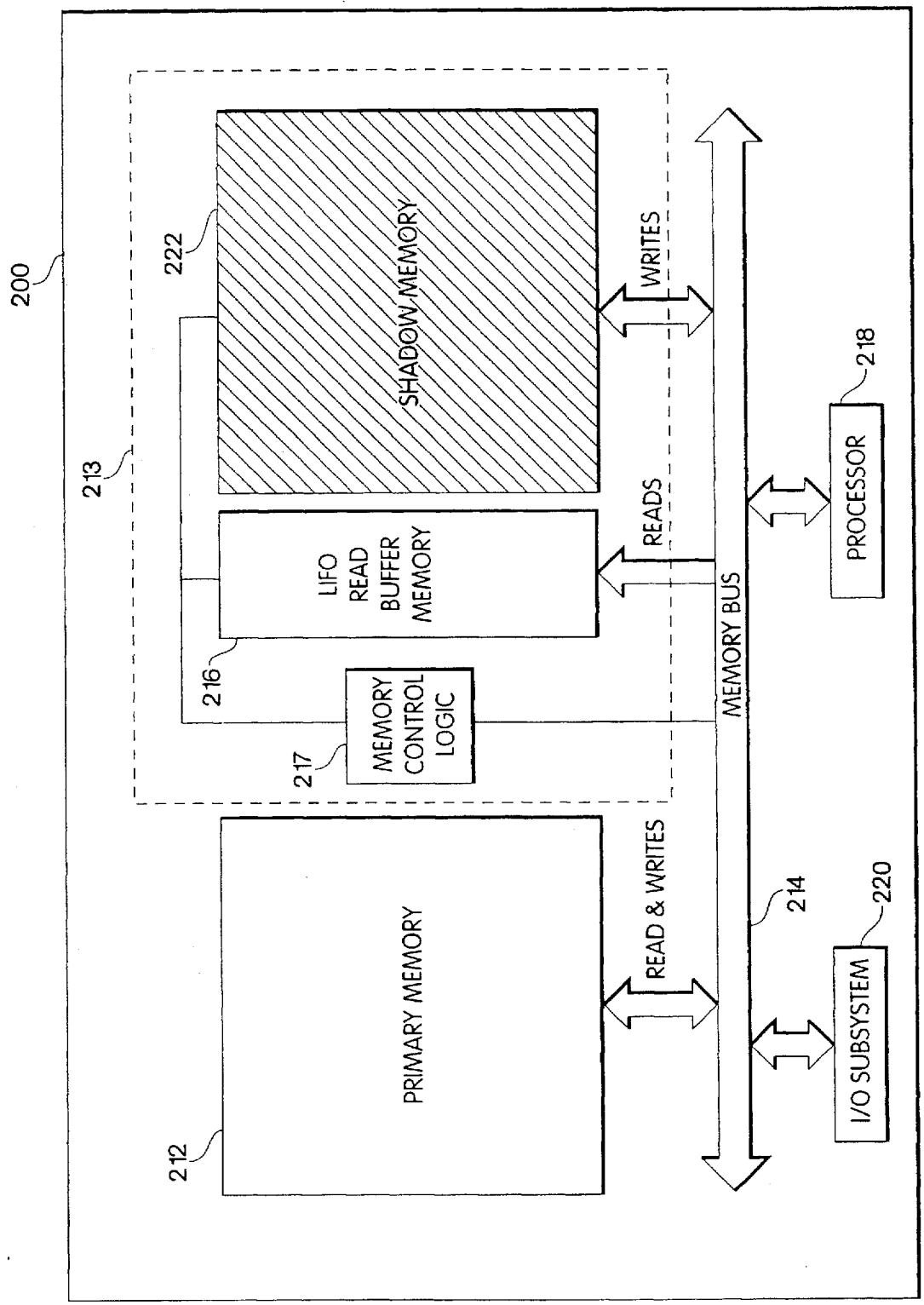
FIG. 2 is a block diagram of a fault tolerant computer system utilizing a read buffer memory in accordance with one embodiment of the present invention.

One embodiment of a checkpoint-based fault tolerant computer system 200 according to the present invention is shown in FIG. 2. In the embodiment shown in FIG. 2, a checkpoint memory element 213 utilizes a last-in, first-out (LIFO) read buffer memory 216 to return a shadow memory 222 to the checkpoint state following a fault. The fault tolerant computer system 200 shown in FIG. 2 comprises a primary memory 212 coupled to a memory bus 214, a processor 218 coupled to the memory bus, a checkpoint memory 213, including a LIFO read buffer memory 216, coupled to the memory bus using the same logical port as the primary memory, a shadow memory 222 coupled to the memory bus 214 using the same logical port as the primary memory, and memory control logic 217 coupled to the memory bus, the LIFO read buffer memory and the shadow memory. I/O devices may be coupled to the processor via the bus 214. The bus 214 may also be another kind of interconnection mechanism like a cross-point switch. As shown in FIG. 1, the system 200 in FIG. 2 may have multiple and/or redundant processors, I/O elements, interconnections, etc.

Figure 3:
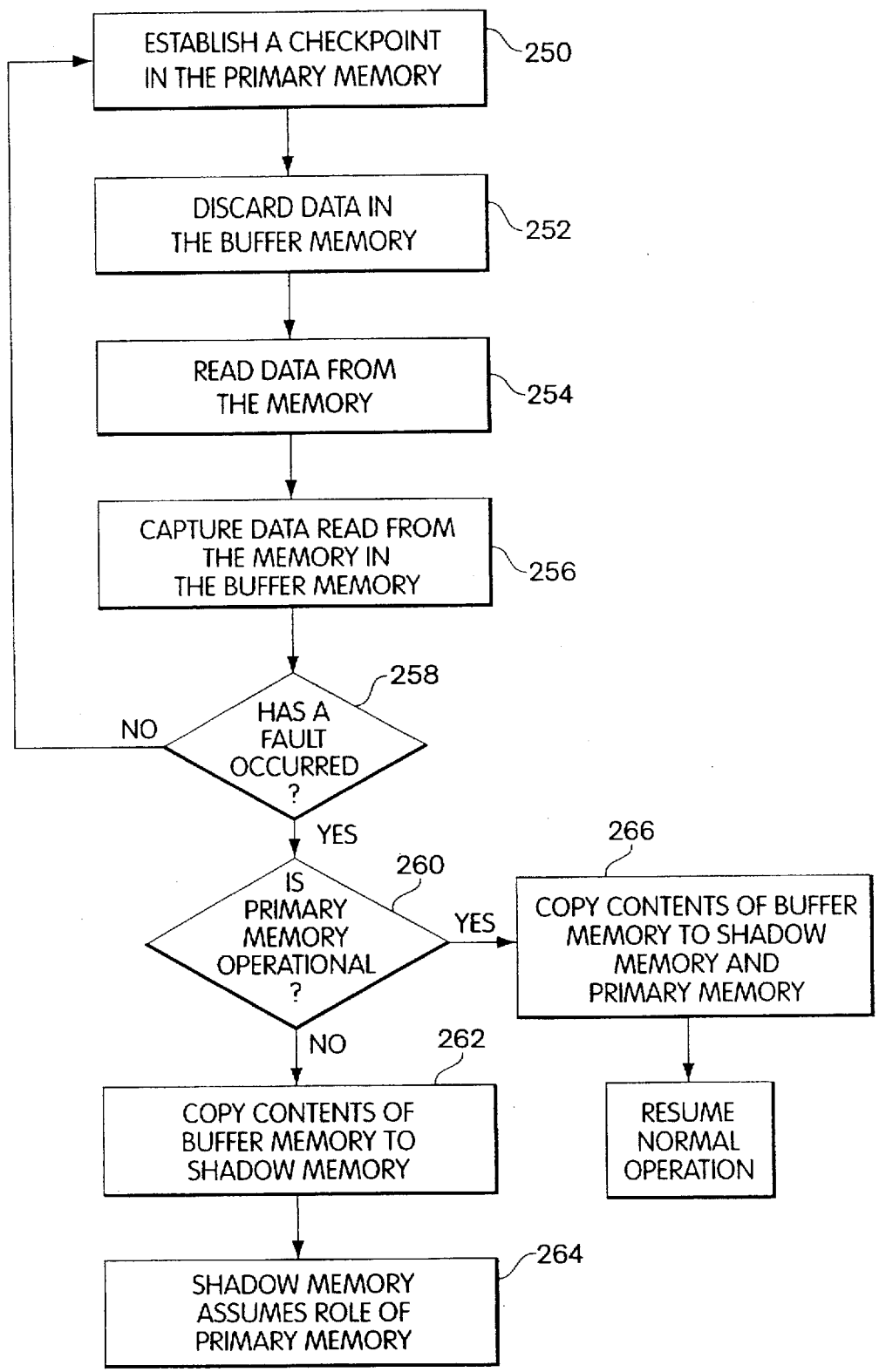
FIG. 3 is a flowchart describing the operation of the computer system of FIG. 2.

The operation of this embodiment is described with reference to FIG. 3. The LIFO read buffer memory 216 stores certain data read from the primary memory 212 along with associated addresses (steps 254 and 256). Data written to the primary memory are stored by both the primary memory 212 and the shadow memory 222, so that the contents of the shadow memory "mirror", i.e., contains the same data as, the contents of the primary memory. The memory control logic 217 controls the transfer of data among the memories.

The processor 218, as well as any other processors coupled to the memory bus 214, periodically flush their caches out to the primary memory 212 to establish checkpoints (step 250). When a new checkpoint is committed, the contents of the LIFO read buffer memory are discarded (step 258). There is no need to write the contents of the LIFO read buffer memory 216 into the shadow memory 222. The description of cache flushing will be provided in connection with FIGS. 1 and 4–6.

To checkpoint a consistent system state, processors flush the caches in a synchronized manner. Once a processing element 14 has begun a flush, it cannot resume normal operation until all other processing elements 14 have completed their flushes, except under certain conditions discussed below. This process allows data to be passed from one processing element 14 to another processing element 16 without requiring the entire cache 42 of processing unit 14 to be flushed. If all processing units 44 in the computer system 11 have access to all buses or communication paths to the main memories, each processing unit 44 may use conventional bus snooping methods to assure cache coherency. If all processing units 44 do not have access to all system buses, the processing units 44 may use other well-known cache coherency techniques instead.

Processor cache flushing is synchronized because the buffer memory needs to distinguish between post-flush and pre-flush data. Thus, if the buffer cannot make this distinction all processors must complete their flushes before normal operation can begin in order to maintain consistency. Synchronization is preferably controlled using a test-and-set lock or equivalent operation using a designated location in main memory, such as indicated at 80 in FIG. 4, to store the lock value. To ensure that it is possible to recover from primary memory element failures as well as other failures, this designated location is preferably implemented as part of a status register in the shadow memory element. A failure in the shadow memory element does not disrupt normal operation. Consequently, this data structure is not needed in this event.

Figure 5:
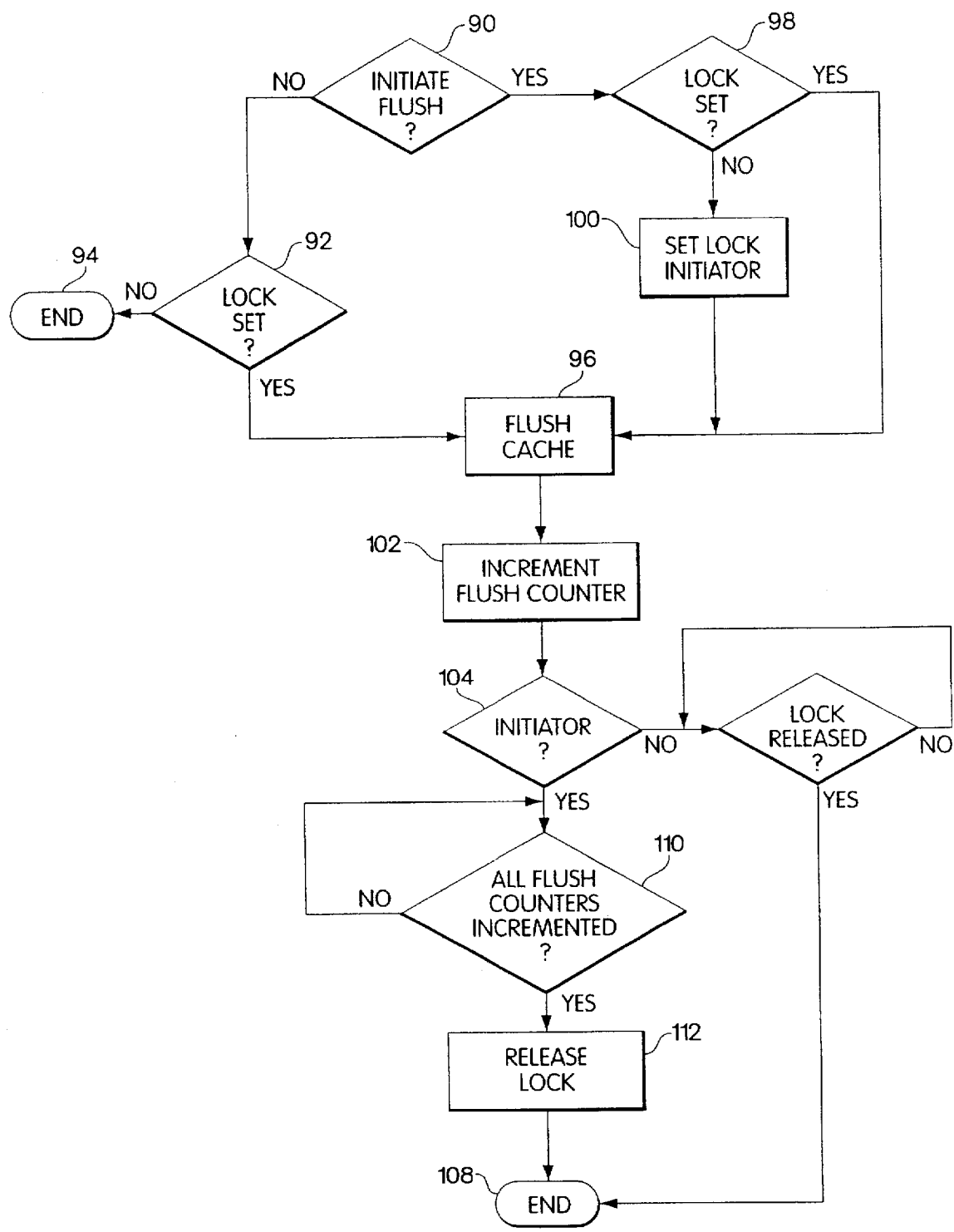
FIG. 5 is a flowchart describing how each processing unit controls flushing of its cache to maintain main memory consistency.

At periodic intervals, each processing unit 44 determines whether it should initiate a flush operation as indicated at step 90 in FIG. 5. The processing unit 44 can make this determination in a number of different ways. Typically, a flush may be initiated after a fixed period of time has elapsed.

If this processing unit 44 does not need to initiate a flush, then it examines the designated memory location 80 to determine whether another processing unit 44 has already set the lock (step 92). If the lock is not set, this process ends as indicated at 94. Otherwise, if the lock is set, this processing unit 44 flushes its cache 42 in step 96. The effect of the flushing operation is to store all lines in the cache (or preferably only those lines that have been modified since the last flush) to the primary memory element 212, and to the shadow memory 222 (if any) of the checkpoint memory element 213 as well. Prior to the actual flushing operation, the processing unit 44 saves its state in the cache 42 so that this information is flushed as well.

Input and output (I/O) operations are normally handled in the following manner. During normal operations, I/O requests are made in any standard way, and are entered on an appropriate I/O queue by the operating system. However, the actual physical I/O operation is not initiated until the next checkpoint. Thus, in the event of a fault and a subsequent rollback to a checkpointed state, all pending I/O operations are also checkpointed. Disk and other idempotent I/O operations, i.e., operations that can be repeated without changing the result, can simply be restarted.

The appropriate disposition of communications I/O activities depends upon the communication protocol. For those protocols that accommodate the possible duplication of messages, the pending I/O can be restarted. For those protocols that handle dropped messages, the I/O can be deleted from the pending queue. For those protocols that do not handle either dropped messages or repeated messages, the pending I/O is deleted from the pending queue. If the message was not actually sent before the fault, or was aborted as a result of the fault, the effect is the same as a transient communication link failure with the same consequences to the application or to the user. Since communication link interruptions are generally considerably more common than computer faults, the use of a protocol that cannot make such events transparent presumably means that the user or the application is prepared to cope with them in any event.

If the processing unit 44 determines in step 90 that it should initiate a flush, it then determines whether the lock is already set in step 98, similar to step 92. If the lock is already set, the processing unit 44 continues by flushing its cache 42 in step 96. Otherwise, it sets the lock in step 100, sends a message to the other processors to trigger their flush line operations thereby identifying itself as the initiator of the flush, before flushing its cache 42.

Figure 4:
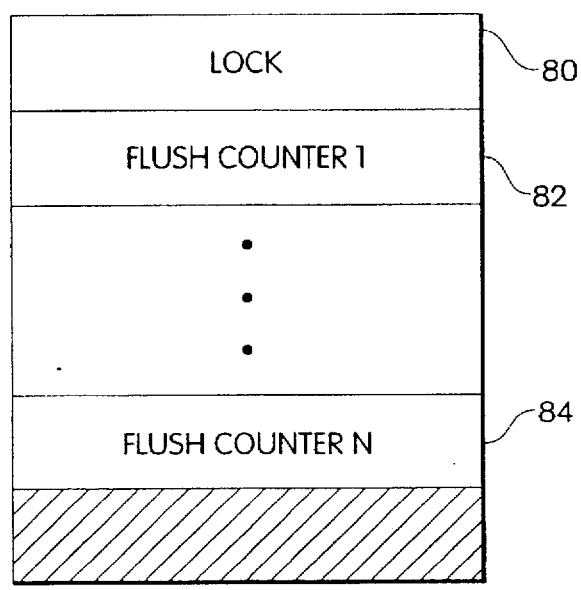
FIG. 4 is a diagram of memory locations used by the processing units to maintain main memory consistency.

After a processing unit 44 flushes its cache 42 in step 96, it increments its corresponding flush counter in step 102. As indicated in FIG. 4, each processing unit 44 has a flush counter, such as shown at 82 and 84, which are predetermined designated locations in main memory 18. After the flush counter (e.g., 82) is incremented, the processing unit 44 determines whether it is the initiator of this flush sequence (step 104). If it is not the initiator, it then waits until the lock is released in step 106. When the lock is released, this process ends in step 108 and the processing unit 44 may resume normal operations.

If the processing unit 44 is the initiator of the flush as determined in step 104, it then waits until all flush counters (82-84) are incremented in step 105. Once all flush counters have been incremented, this processing unit 44 sends a commit command to the checkpoint memory element, thereby instructing the checkpoint memory element 213 to clear the read buffer 216. Receipt of the command notifies the checkpoint memory element 213 that the flush has completed. Once this command has been sent, the flush lock is released and the processing units 44 can resume normal processing. The loops around steps 106 and 110 should have time-out protection which triggers fault recovery procedures, in the event of a failure during flushing operations.

Note that the flush counters described here may be 1-bit counters and hence can also readily be implemented as part of a status register in the checkpoint memory element 213. The bits can be set individually by each processor and then automatically reset when the initiator sends the commit command.

Some performance advantage can be gained if certain non-standard bus protocols are also implemented. For example, if the bus protocol allows the checkpoint memory element 213 to distinguish between processing elements 14, or at least to identify whether a line being stored has been written by a processing element 14 that has completed its ith flush or is still executing its ith flush, or at least to distinguish pre-flush from post-flush data, a processing element 14 does not have to wait until all other processing elements have completed their flushes before it resumes normal operation. In this case, consistency is maintained in main memory by requiring a processing element 14 to suspend normal operation after completing its ith flush only until all other processing elements 16 have also at least begun (but not necessarily completed) their ith flushes.

Figure 6:
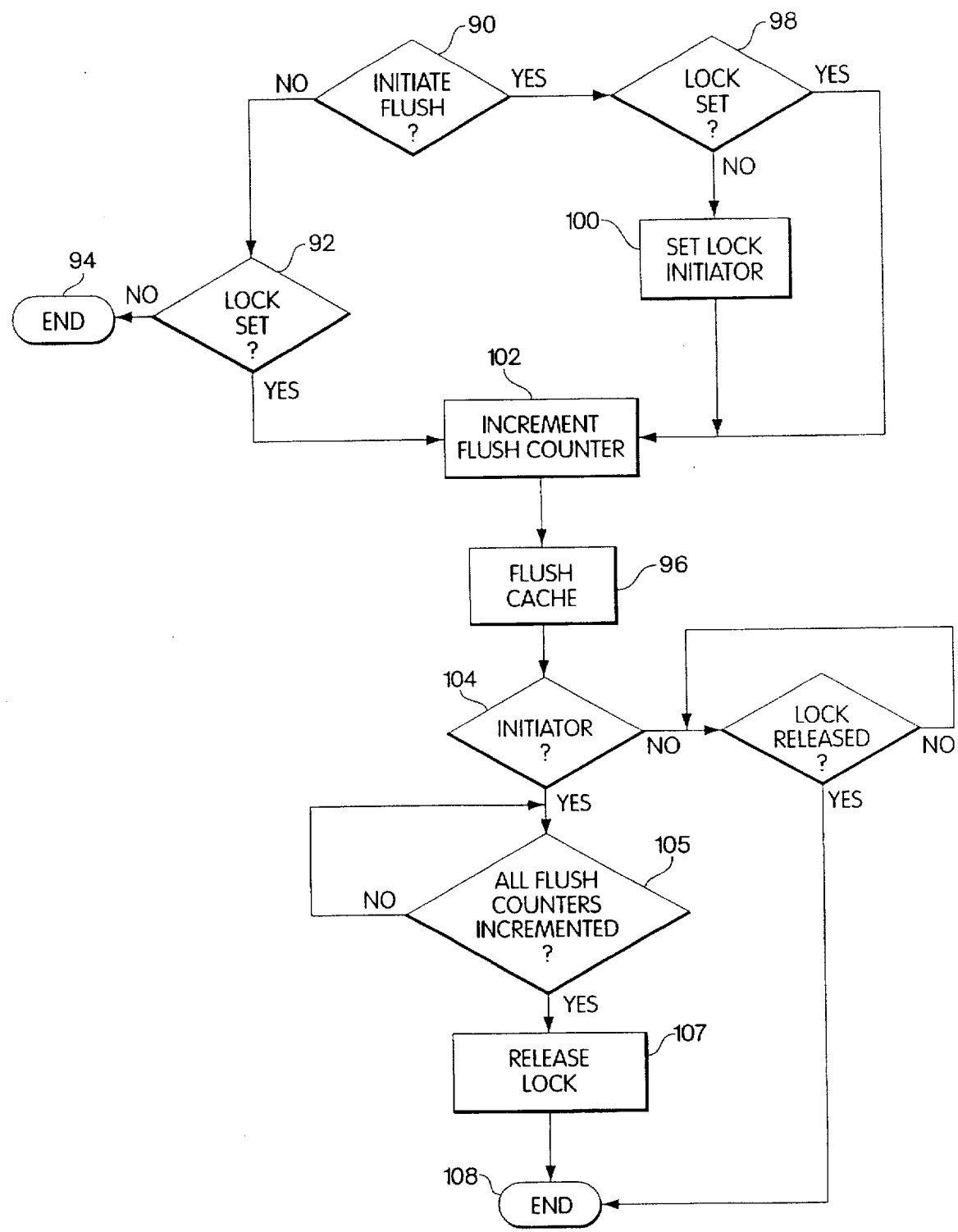
FIG. 6 is a flowchart describing an alternate method by which each processing unit controls flushing of its cache to main memory.

This relaxed synchronization restriction still ensures the existence of a consistent checkpoint state. That is, it guarantees that a processing element 16 that has not begun its flush does not receive post-flush modified data from another processing element 14 that has completed its flush and resumed normal processing. This less restrictive synchronization protocol can be allowed if the logic associated with the checkpoint memory element 213, perhaps using the bus protocol, can distinguish between data that is being written as part of the flushing operation, and data that is being read or written by a processing element 14 that has completed its flush. To implement this kind of cache flushing synchronization, the order and placement of steps 96 and 102 in FIG. 5 may be reversed as shown in FIG. 6.

In case of a fault in the fault tolerant computer system 200 (step 258), data captured in the read buffer memory 216 is used to restore all lines of the primary memory and the shadow memory that were modified since the last checkpoint to their state at the time of the checkpoint (step 256). The LIFO read buffer memory contains, for any lines in the primary memory modified since the last checkpoint, the state of these lines at the last checkpoint. In the case of lines in the primary memory 212 that have been modified more than once since the last checkpoint, the LIFO read buffer memory will contain the state of the lines at an intermediate stage and at the last checkpoint. The contents of the LIFO memory are read in the reverse order from which they were written, so that lines modified more than once will be returned to the checkpoint state in the primary memory (step 264).

If a fault occurs in the primary memory (step 260), the shadow memory is used to replace any portion of data in the primary memory that is damaged and is not contained in the LIFO read buffer memory. Alternatively, the shadow memory may assume the role of the primary memory after a fault to the primary memory.

An alternate way to implement this embodiment does not use the shadow memory 222. In this embodiment, the read buffer memory 216 is still used to restore the primary memory to the state of the previous checkpoint in the event of a fault. However, the computer system is not able to recover from a failure that results in the loss of any portion of the primary memory 212, the contents of which have not been captured in the LIFO read buffer memory since the last checkpoint.

A disadvantage of the read buffering scheme of the embodiment of the invention shown in FIG. 2, as opposed to write buffering schemes, is that processors generally read considerably more data than they write, so that the read buffer memory 216 may have to be significantly larger than a corresponding write buffer memory. This disadvantage is exacerbated in systems in which it is not possible for the memory control logic 217 to distinguish between code accesses and data accesses or between accesses to data that will not be subsequently modified and those to data that will be subsequently modified. Since read data must be retained as long as it may be valid in any cache, it may be necessary periodically to invalidate the entire contents of all caches to keep the LIFO read buffer from becoming infinitely large.

In an embodiment of the invention, this disadvantage is eliminated by using a cache coherency protocol such that the first attempt to modify any cache line is made visible to the remainder of the system. A pre-image of the line to be modified, corresponding to the state of the line before modification, may then be copied from the primary memory, or, preferably, the shadow memory if it exists, to the LIFO read buffer memory before the modified cache line is rewritten to the primary memory. This can be accomplished in some computer systems by treating all memory as shared. Thus, each processor is forced either to execute a read-with-intent-to-write operation or an invalidate operation whenever it modifies any data line. These operations are visible to the checkpoint memory element which can use the associated addresses to determine what to buffer. In this scheme, the cache coherency protocol must be one that ensures that every first write to memory of any line already in cache results in a read from memory of the pre-image of the line into the LIFO read buffer memory. Alternatively, on every write to memory, including those taking place during cache flush operations, the memory control logic can first read the memory location that is to be written and capture that read data and its associated address in the LIFO buffer. This procedure is not standard and results in a reduced effective memory bandwidth. It should be understood that an access may be to a partial cache line as well as an entire cache line.

Another embodiment of the invention which does not require a bus protocol change is one where all reads are captured in the read buffer. Each processor's entire cache is then invalidated at the time of the flush.

In a variation on this embodiment of the invention, the number of times data is written to the read buffer memory may be reduced further by first checking to determine if the address of any line that is to be written into the read buffer has already been stored in that buffer and inhibiting the write if it has. This scheme can be implemented using a content addressable memory rather titan a LIFO as the read buffer memory.

In embodiments of the present invention described above, individual elements, including processors, memories, and I/O devices, of computer systems have been described as being interconnected by one or more memory buses. It should be understood that the memory buses may be replaced by other interconnecting mechanisms for transferring data, such as a cross-point switch, to accomplish the same function.

While a number of embodiments and variations of the present invention have been described, it should be recognized that each of them has its own advantages and disadvantages relative to the others and that no one of them is superior to all the others in all situations. Which embodiment is most appropriate for a given situation depends upon the underlying computer platform to which it is being applied and upon the desired level of fault tolerance.

One advantage of the present invention over the prior art is that checkpoints are established without placing special requirements on the underlying computer platform. A second advantage is that neither application programs nor users need to be involved with, or even to be aware of, the checkpointing process. This system also is compatible with, but does not require, memory duplication so that it is possible to recover from memory faults as well as other hardware and software faults. This embodiment is particularly useful in low-end systems to provide the ability to recover from software errors and transient hardware faults without a requirement of a duplicate memory.

Given the embodiments of the invention described herein, it should be apparent to those skilled in the art that the foregoing is merely illustrative and not limiting, having been presented by way of example only. Numerous modifications made other embodiments are within the scope of one of ordinary skill in the art and are contemplated as falling within the scope of the invention as defined by the appended claims and equivalents thereto.

What is claimed is:

1. A computer system comprising:
   a processor: and
   a main memory subsystem coupled to the processor wherein the main memory subsystem includes:
   a primary memory element to which data is written and from which data is read;
   a read buffer coupled to the primary memory element, that captures and stores data read from the primary memory element; and a shadow memory, coupled to the main memory subsystem, that receives data written to the main memory subsystem and stores the data simultaneously with the primary memory element; and means for copying the data from the read buffer to the primary memory element and the shadow memory in response to an instruction from the processor, so that the main memory subsystem can be returned to a consistent checkpoint state from which processing can resume without loss of data integrity or program continuity following a fault.

2. A computer system comprising:

a processor; and a main memory subsystem coupled to the processor, wherein the main memory subsystem includes:

a primary memory element to which data is written and from which data is read;

a read buffer, coupled to the primary memory element, that captures and stores data read from the primary memory element and including means for ensuring that a premodified version of all data to be modified during any interval between checkpoints has been captured in the read buffer during that same interval and means for copying the data from the read buffer to the primary memory element, so that the main memory subsystem can be returned to a consistent checkpoint state from which processing can resume without loss of data integrity or program continuity following a fault.

3. A computer system comprising:

a processor; and a main memory subsystem coupled to the processor, wherein the main memory subsystem includes:

a primary memory element to which data is written and from which data is read;

a read buffer, coupled to the primary memory element, that captures and stores data read from the primary memory element and including means for determining whether the data read from memory will be modified, and for storing in the read buffer only data that will be modified during any given interval between checkpoints; and means for copying the data from the read buffer to the primary memory element, so that the main memory subsystem can be returned to a consistent checkpoint state from which processing can resume without loss of data integrity or program continuity following a fault.

4. The computer system of claim 3, wherein the means for determining includes means for determining whether data to be modified has previously been modified in a given checkpoint interval and storing only a first premodified copy of that data.

5. A computer system comprising:

a processor having a cache, internal registers and an input/output event queue; and a main memory subsystem coupled to the processor, wherein the main memory subsystem includes:

a primary memory element to which data is written and from which data is read;

a read buffer, coupled to the primary memory element, that captures and stores data read from the primary memory element;

means for copying the data from the read buffer to the primary memory element, so that the main memory subsystem can be returned to a consistent checkpoint state from which processing can resume without loss of data integrity or program continuity following a fault, and wherein the processor periodically flushes the cache, internal registers and input/output event queue, and upon completion of the flushing, establishes a checkpoint and instructs the read buffer memory to discard all data previously stored in the read buffer memory.

6. The computer system of claim 3, wherein the read buffer memory is a last in first out memory, so that when the read buffer memory is read, data previously written into the memory is read from the buffer memory in a reverse order from an order in which the data was written into the read buffer memory.

7. A computer system comprising:

a processor;

an input/output port;

a main memory subsystem coupled to the processor and to the input/output port, wherein the main memory subsystem includes:

a primary memory element to which data is written and from which data is read;

a read buffer, coupled to the primary memory element, that captures and stores data read from the primary memory element; and means for copying the data from the read buffer to the primary memory element, so that the main memory subsystem can be returned to a consistent checkpoint state from which processing can resume without loss of data integrity or program continuity following a fault, wherein each processor has a corresponding input/output subsystem which provides input/output events initiated by the processor, wherein each processor has means for queuing input/output events between checkpoints and means for flushing the queued events to the main memory subsystem when a checkpoint is to be established, whereby input/output events are captured in checkpoint data in the main memory subsystem.

* * * * *